D. H. Tierney.

Neck Tie.

No 2033 Reissued June 14, 1870

Witnesses:
Thos. Haynes
R. Rabeau

Dennis H. Tierney
per Brown Coombs & Co
Attorneys

United States Patent Office.

DENNIS H. TIERNEY, OF FORRESTVILLE, CONNECTICUT.

*Letters Patent No.* 84,974, *dated December* 15, 1868; *reissue No.* 4,033, *dated June* 14, 1870.

IMPROVEMENT IN FASTENINGS FOR NECK-TIES.

The Schedule referred to in these Letters Patent and making part of the same.

*To all whom it may concern:*

Be it known that I, DENNIS H. TIERNEY, formerly of Waterbury, in the county of New Haven and State of Connecticut, but now of Forrestville, in the county of Hartford, same State, have invented a new and useful Improvement in Neck-tie Fasteners, of which the following is a full, clear, and exact description, reference being had to the accompanying drawings forming part of this specification, and in which—

Figure 1:
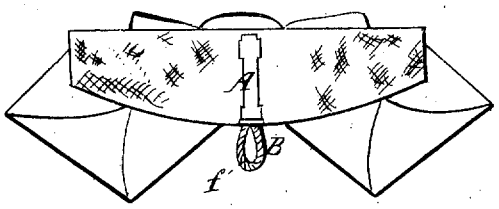
Figure 2:
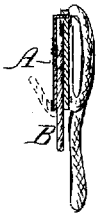
Figure 3:
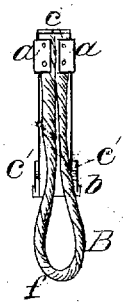
Figure 4:
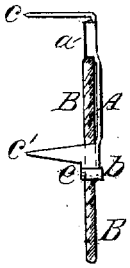

Figure 1 represents an inside face view of a neck-tie with my improvement applied thereto;

Figure 2, a transverse section through the tie, in illustration of the manner of applying and securing the elastic cord;

Figure 3, an under side or rear view of a fastening as detached from the tie, showing the elastic cord as secured by it;

Figure 4, an edge view of the same; and

Figure 5:
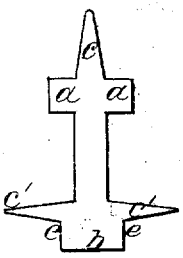

Figure 5 represents a metal blank, from which the fastening that holds the elastic cord, as shown in the previous figures, is made.

This invention consists in a novel application of the elastic cord or loop to the tie, whereby the same is made capable of longer extension or greater elasticity without increasing the size of that portion of the loop which hitches onto the button, and which may be termed the button-hole, so that the tie may be more readily and securely attached to the shirt or collar of the wearer than by the ordinary attachment or application of the elastic loop. While the mere form or length of the metal fastening which I use may be changed, it will suffice here to describe it under one form of construction, and whereby, in order to carry out my invention, the elastic loop is fastened to the tie at or near its top, and made to extend below the guiding loop or eye near the bottom edge of the tie, so that on bending over the lower protruding end of the loop the same is contracted from the point at which it is bent over, and made to form a short button-hole.

Referring to the accompanying drawings—

A is a metal plate, stamped, or otherwise produced, from a thin plate of suitable metal into a formation as shown at fig. 5, with points *c c′ c′*, lips *a a*, shoulders *e e*, and lower extension *b*.

B is an elastic cord, of such length that, with its ends placed against the inner surface of the upper end of the plate A, its central portion *f* will extend slightly below the lower extremity of said plate in the form of a loop.

The said ends of the elastic cord B are secured to the plate A at the above-described locality by the bending over of the lips or clamps *a a*, so as to clamp the said ends and secure the same firmly to the plate.

*c c′ c′* are pointed projections provided upon the upper end and near the lower extremity of the said plate A, and are bent at right angles to the flat surface of said plate for attachment thereof to the neck-tie, by the penetrating and clinching of said points through the texture of the tie, as illustrated in fig. 2.

The plate, thus secured to the tie, forms a fastening, through and below which, and beyond the bottom edge of the tie, the looped cord projects in such manner as to provide for the extension of the whole length of the loop, from its upper end, at or near the top edge of the tie, and so afford facility by the large amount of elasticity thus obtained, for the attachment of the loop to the button or stud of the shirt-collar, but when the tie has been secured, it shortens the effective length or button-hole of the loop, which is only the part beyond the bottom edge of the tie, and so gives greater security of attachment.

This fastener, applied to the tie as described, is operated, in the attachment of the tie by the wearer, by stretching the elastic cord and bending its looped portion or button-hole to hitch onto the button of the shirt or collar.

In case of the bow of the tie being on the reverse side to that here shown, then the loop, in fastening the tie onto the button, would, of course, require to be bent over in a reverse direction to that indicated in fig. 2.

What is here claimed, and desired to be secured by Letters Patent, is—

The elastic loop B, rigidly secured at its base, and its free or doubled end passing through a guiding loop or eye, in such manner as to admit of extension and retraction beyond the amount due to the protruding loop or button-hole, substantially as herein set forth.

DENNIS H. TIERNEY.

Witnesses:

HENRY A. MITCHELL,

JAMES COUGHLAN.